United States Patent
Bytheway et al.

(10) Patent No.: US 10,152,163 B2
(45) Date of Patent: Dec. 11, 2018

(54) METHOD OF REDUCING THE SPACE OCCUPIED BY ELECTRODE ROUTING TRACES ON SINGLE LAYER TOUCH SENSOR

(71) Applicant: CIRQUE CORPORATION, Salt Lake City, UT (US)

(72) Inventors: Jared G. Bytheway, Sandy, UT (US); Steven M. Austin, Riverton, UT (US)

(73) Assignee: CIRQUE CORPORATION, Salt Lake City, UT (US)

( * ) Notice: Subject to any disclaimer, the term of this patent is extended or adjusted under 35 U.S.C. 154(b) by 343 days.

(21) Appl. No.: 15/066,875

(22) Filed: Mar. 10, 2016

(65) Prior Publication Data

US 2016/0266710 A1    Sep. 15, 2016

Related U.S. Application Data

(60) Provisional application No. 62/130,796, filed on Mar. 10, 2015.

(51) Int. Cl.
    *G06F 3/045*      (2006.01)
    *G06F 3/044*      (2006.01)
    *G06F 3/041*      (2006.01)

(52) U.S. Cl.
    CPC ............ *G06F 3/0416* (2013.01); *G06F 3/044* (2013.01); *G06F 2203/04111* (2013.01)

(58) Field of Classification Search
    CPC ................................ G06F 3/044; G06F 3/0416
    USPC ......................................... 345/174; 178/18.06
    See application file for complete search history.

(56) References Cited

U.S. PATENT DOCUMENTS

| | | | |
|---|---|---|---|
| 8,910,104 B2 | 12/2014 | Bytheway et al. | |
| 9,231,588 B2 | 1/2016 | Trend et al. | |
| 9,360,972 B1 | 6/2016 | Avery et al. | |
| 2011/0095991 A1 | 4/2011 | Philipp | |
| 2012/0075215 A1 | 3/2012 | Yeh | |
| 2012/0319974 A1* | 12/2012 | Kim | G06F 3/044 345/173 |
| 2013/0081869 A1* | 4/2013 | Kim | G06F 3/044 174/261 |
| 2013/0082719 A1* | 4/2013 | Prendergast | G06F 3/0418 324/658 |
| 2013/0181942 A1* | 7/2013 | Bulea | G06F 3/044 345/174 |
| 2013/0181943 A1 | 7/2013 | Bulea et al. | |
| 2014/0327649 A1* | 11/2014 | Lee | G06F 3/044 345/174 |
| 2015/0042615 A1 | 2/2015 | Yilmaz | |
| 2015/0109233 A1* | 4/2015 | Moore | G06F 3/0418 345/174 |

(Continued)

*Primary Examiner* — Adam J Snyder
(74) *Attorney, Agent, or Firm* — Parsons Behle & Latimer

(57) ABSTRACT

A system and method for reducing the number of electrodes needed to operate a touch sensor by arrangement of drive and sense electrodes on a single layer touch sensor, the electrodes being arranged such that drive signals that are sent to the electrodes are sent in a non-uniform pattern that enables selected regions of the touch sensor to generate a useful drive signal while the remaining regions do not. The arrangement of the drive and sense electrodes is such that the routing of signals to and from the electrodes may not interfere with operation of the touch sensor.

10 Claims, 5 Drawing Sheets

(56) References Cited

U.S. PATENT DOCUMENTS

| | | | |
|---|---|---|---|
| 2015/0116254 A1* | 4/2015 | Solven | G06F 3/044 345/174 |
| 2016/0004343 A1* | 1/2016 | Gourevitch | G06F 3/044 345/174 |
| 2016/0026294 A1* | 1/2016 | Tang | G06F 3/044 345/174 |
| 2016/0117044 A1* | 4/2016 | Weng | G06F 3/0416 345/174 |
| 2016/0179241 A1* | 6/2016 | Vandermeijden | G06F 3/044 345/174 |
| 2016/0195981 A1* | 7/2016 | Shin | G06F 3/0416 345/174 |
| 2016/0196001 A1* | 7/2016 | Ku | G06F 3/0418 345/174 |

* cited by examiner

METHOD OF REDUCING THE SPACE OCCUPIED BY ELECTRODE ROUTING TRACES ON SINGLE LAYER TOUCH SENSOR

BACKGROUND OF THE INVENTION

Field of the Invention

This invention relates generally to touch sensors. Specifically, the invention pertains to a system and method for reducing the number of electrodes that are needed in order to perform sensing on a single layer touch sensor.

Description of Related Art

There are several designs for capacitance sensitive touch sensors which may take advantage of a system for reducing electrodes. It is useful to examine the underlying technology of the touch sensors to better understand how any capacitance sensitive touchpad can take advantage of the present invention.

The CIRQUE® Corporation touchpad is a mutual capacitance-sensing device and an example is illustrated as a block diagram in FIG. 1. In this touchpad 10, a grid of X (12) and Y (14) electrodes and a sense electrode 16 is used to define the touch-sensitive area 18 of the touchpad. Typically, the touchpad 10 is a rectangular grid of approximately 16 by 12 electrodes, or 8 by 6 electrodes when there are space constraints. Interlaced with these X (12) and Y (14) (or row and column) electrodes is a single sense electrode 16. All position measurements are made through the sense electrode 16.

The CIRQUE® Corporation touchpad 10 measures an imbalance in electrical charge on the sense line 16. When no pointing object is on or in proximity to the touchpad 10, the touchpad circuitry 20 is in a balanced state, and there is no charge imbalance on the sense line 16. When a pointing object creates imbalance because of capacitive coupling when the object approaches or touches a touch surface (the sensing area 18 of the touchpad 10), a change in capacitance occurs on the electrodes 12, 14. What is measured is the change in capacitance, but not the absolute capacitance value on the electrodes 12, 14. The touchpad 10 determines the change in capacitance by measuring the amount of charge that must be injected onto the sense line 16 to reestablish or regain balance of charge on the sense line.

The system above is utilized to determine the position of a finger on or in proximity to a touchpad 10 as follows. This example describes row electrodes 12, and is repeated in the same manner for the column electrodes 14. The values obtained from the row and column electrode measurements determine an intersection which is the centroid of the pointing object on or in proximity to the touchpad 10.

In the first step, a first set of row electrodes 12 are driven with a first signal from P, N generator 22, and a different but adjacent second set of row electrodes are driven with a second signal from the P, N generator. The touchpad circuitry 20 obtains a value from the sense line 16 using a mutual capacitance measuring device 26 that indicates which row electrode is closest to the pointing object. However, the touchpad circuitry 20 under the control of some microcontroller 28 cannot yet determine on which side of the row electrode the pointing object is located, nor can the touchpad circuitry 20 determine just how far the pointing object is located away from the electrode. Thus, the system shifts by one electrode the group of electrodes 12 to be driven. In other words, the electrode on one side of the group is added, while the electrode on the opposite side of the group is no longer driven. The new group is then driven by the P, N generator 22 and a second measurement of the sense line 16 is taken.

From these two measurements, it is possible to determine on which side of the row electrode the pointing object is located, and how far away. Using an equation that compares the magnitude of the two signals measured then performs pointing object position determination.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes 12, 14 on the same rows and columns, and other factors that are not material to the present invention. The process above is repeated for the Y or column electrodes 14 using a P, N generator 24

Although the CIRQUE® touchpad described above uses a grid of X and Y electrodes 12, 14 and a separate and single sense electrode 16, the sense electrode can actually be the X or Y electrodes 12, 14 by using multiplexing.

A touch sensor using the above or other sensing technology may be used to form a touch sensor array of electrodes for a single layer touch sensor.

BRIEF SUMMARY OF THE INVENTION

In a first embodiment, the present invention is a system and method for reducing the number of electrodes needed to operate a touch sensor by arrangement of drive and sense electrodes on a single layer touch sensor, the electrodes being arranged such that drive signals that are sent to the electrodes are sent in a non-uniform pattern that enables selected regions of the touch sensor to generate a useful drive signal while the remaining regions do not. The arrangement of the drive and sense electrodes is such that the routing of signals to and from the electrodes may not interfere with operation of the touch sensor.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

It should be understood that use of the term "touch sensor" throughout this document may be used interchangeably with "proximity sensor", "touch sensor", "touch and proximity sensor", "touch panel", "touchpad" and "touch screen".

A drive line may be an output of a touch controller that is toggled at some frequency and at some amplitude. Drive line signals are intended to be connected to touch sensor drive electrodes. A sense line may be an input to the touch controller that is connected to an analog to digital converter (ADC) where capacitance measurements are made. Sense line signals are intended to be connected to touch sensor sense electrodes.

An electrode is an electrical conductor that can function as a drive line or a sense line that may be part of a touch sensor that interacts with a finger (or other pointing object) while an electric field is present. Electrodes may be driven with a voltage to produce an electric field when functioning as drive lines, or they may receive an electric field when functioning as sense lines. A drive electrode is an electrode that is driven with a voltage to produce an electric field that may interact with one or more fingers. Drive electrodes may be connected to drive lines that may be transmitted from a touch controller. A sense electrode may be an electrode that receives electric fields from drive electrodes and modulated by one or more fingers. Sense electrodes may be connected to sense lines that may be inputs to a touch controller.

Traditional touch sensors may be constructed with two layers of conductive traces formed from indium-tin oxide (ITO) to achieve an orthogonal array of electrodes, commonly referred to as X and Y electrodes arrays. The embodiments of the present invention are directed to a touch sensor that eliminates one of the substrate layers to reduce costs and resulting in a single layer touch sensor.

One method has already been implemented to eliminate one of the two layers of a touch sensor. This method may create a single touch sensor layer by using a large number of jumpers to facilitate crossings of the X and Y electrodes. However, the process that is used to create the jumpers may come at a significant cost. Accordingly, it may be advantageous to eliminate the system of jumpers in favor of the present invention.

Figure 1:
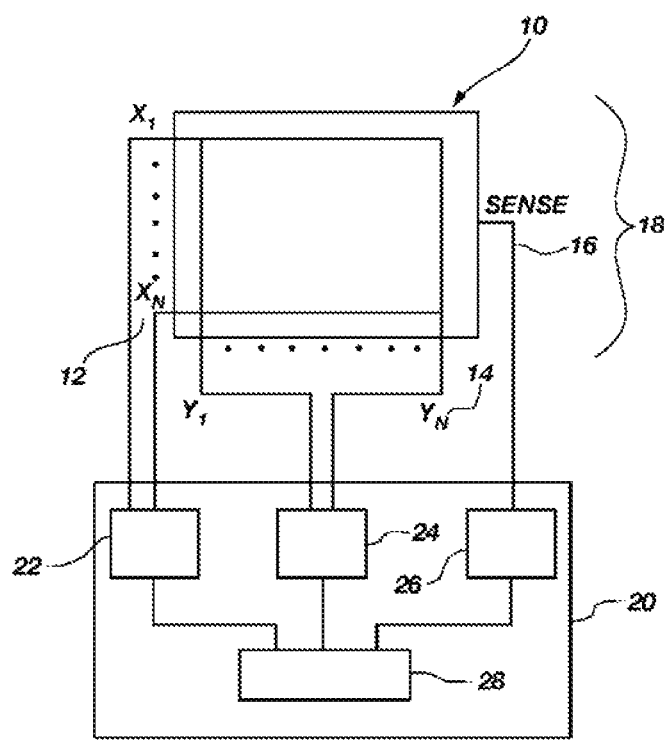
FIG. 1 is a block diagram of operation of a touchpad that is found in the prior art, and which is adaptable for use in the present invention.
Figure 2:
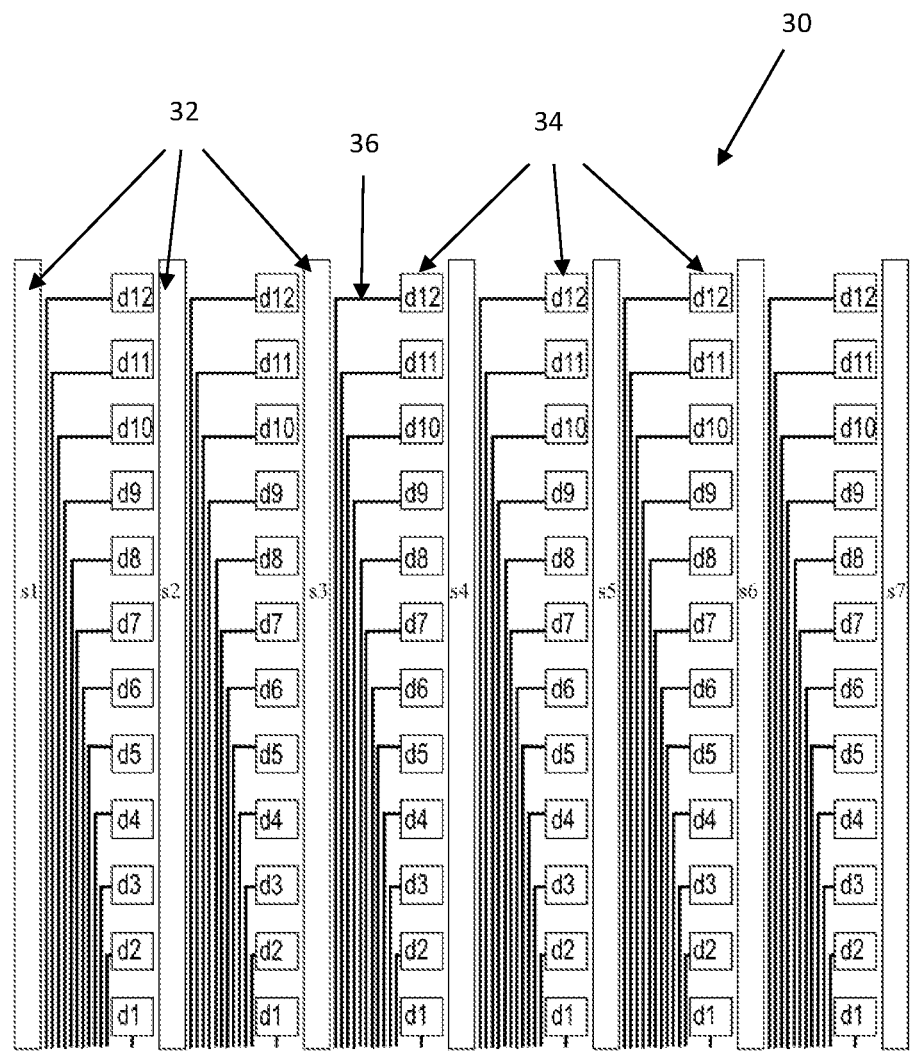
FIG. 2 is a block diagram of a touch sensor showing an arrangement of electrodes that is found in the prior art.

FIG. 2 illustrates one attempt of the prior art to eliminate the jumpers on a touch sensor 30 by forming sense electrodes as long electrode strips, while the drive electrodes are made up of a large number of discrete electrode pads. In FIG. 2, sense electrodes are shown as the vertical rectangle electrode strips 32 and labeled as s1, s2, s3, s4, s5, and the drive electrodes are shown as the smaller square electrodes 34 labeled as d1 through d12. It should be understood that the specific shapes of the electrodes are for illustration purposes only. Furthermore, the drive electrodes and sense electrodes may be swapped in function.

Each of the drive electrode pads 34 that have the same number (or position in the vertical array) may be electrically coupled together and would be simultaneously driven by a same drive signal.

This method of the prior art has at least one significant challenge. Specifically, the number of signal route traces 36 that are required to be disposed on the touch sensor 30 for a given touch sensor size are relatively large. The large number of signal route traces 36 that must be provided to each of the drive electrode pads 32 take up valuable space on the touch sensor 30 and may significantly reduce the touch sensor performance by causing dropouts and nonlinearities in the results. The number of signal route traces 36 may also limit the overall size of the touch sensor 30.

With the touch sensor 30 in FIG. 2, there may only be sufficient space for 12 signal route traces 36 for the given pitch. This touch sensor 30 may be limited to only having 12 rows of drive electrodes 34. While the widths of the signal route traces 36 and pitch are not to scale, they may be of typical proportions along with the drive electrode pads 34 and the long sense electrodes 32. Adding more signal route traces 36 needed for a larger touch sensor may significantly reduce the touch sensor performance by causing the drive 34 and sense 32 electrodes to be spaced farther apart and/or to be reduced in size.

Figure 3:
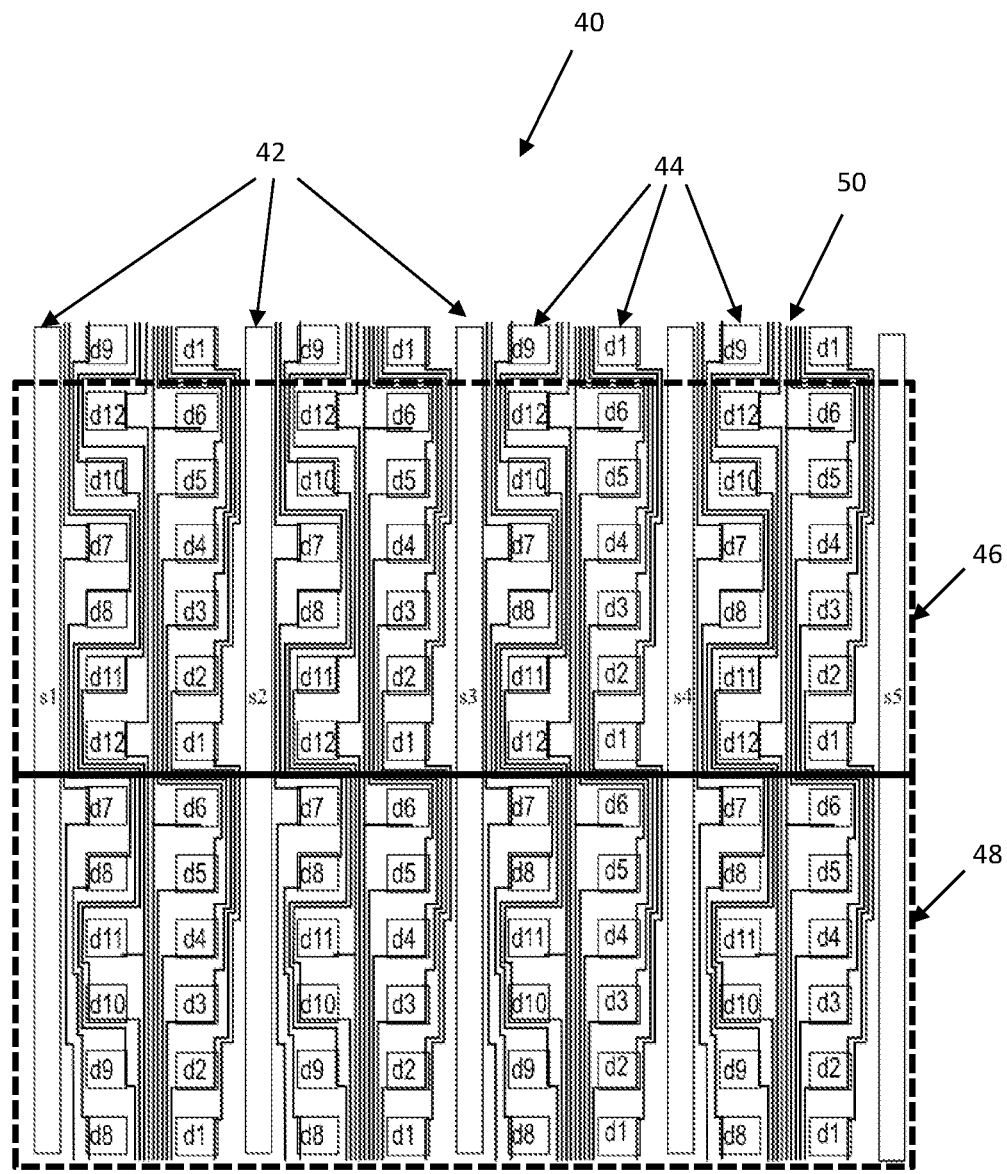
FIG. 3 is a block diagram of the components of a capacitance-sensitive touchpad as made by CIRQUE® Corporation and which may be used in a first embodiment arrangement of drive and sense electrodes in a single layer touch sensor.

A first embodiment of the present invention is shown in FIG. 3. FIG. 3 shows that a touch sensor 40 first embodiment may arrange the sense electrodes 42 as shown in the prior art. However, the placement of the drive electrodes 44 is changed. Specifically, the first embodiment arranges multiple drive electrode pads 44 in a pseudo random arrangement across the touch sensor 40 such that the touch sensor may be divided into distinct regions (also to be referred to as "touch sensor regions") wherein each of the regions may have a different arrangement of drive electrodes.

Having different arrangements of drive electrodes 44 in each region may mean that when the drive electrodes in the touch sensor 40 receive a drive signal, the electric fields generated in each region may be different because of the different arrangement of the drive electrode pads 44. For example, the arrangement of the drive electrode pads 44 in a first region may create a strong electric field. In contrast, the arrangement of the drive electrode pads 44 in a second region may create a weaker or substantially canceled electric field. This different arrangement of the drive electrode pads 44 in different regions may enable the different regions to operate independently of each other and/or reduce interference with each other.

One concept that should be made clear is what is meant when referring to drive electrode pads or sense electrode pads being "different" from each other in a touch sensor region. For example, in FIG. 2, drive electrode pads d1 through d12 are referring to different drive pins on a touch sensor controller. Thus, to say that a touch sensor region has different drive electrode pads means that the source of the signal to the drive electrode pads is different. Conversely, if there are multiple copies of a single drive electrode pad means that there are multiple drive electrode pads that are being driven from the same signal source such as a same drive pin on the touch sensor controller. Likewise, the same concept may be applied to the sense drive pads and the pin to which they are being transmitted on the touch sensor controller.

FIG. 3 shows an example of 12 drive electrode pads 44 labeled d1 through d12 that are arranged in a pseudo random pattern that define a first region 46 and a second region 48 as shown by the dotted boxes. The number of regions is not limited to two. There may be additional different regions above, below, to the right or to the left of the two regions 46, 48 shown. The other regions may have an arrangement of the drive electrode pads 44 that is different from either the first or second regions 46, 48, or one or both of the regions may be repeated as desired.

It should be understood that the specific arrangement of the drive electrode pads 44 may be modified without departing from the embodiments of the invention. Furthermore, it should be understood that the routing traces 50 may be continued above and below the specific arrangement of electrodes shown to create a larger touch sensor 40. It should be understood that the arrangement of the drive electrode pads 44 may be such that only one region has a useful electric field at a time, or more than one region. The regions with useful electric fields may be adjacent or not adjacent to each other.

A touch controller that generates the stimulus patterns transmitted on drive electrodes of the touch sensor 40 may select certain sets of drive electrode pads 44 to be driven at any given time so that each region may be activated with a strong electric field alone or in combination with others.

In another embodiment of the present invention, the phase of the drive signals that are transmitted to the drive electrode pads 44 may also be manipulated to affect electric fields of different regions. In this embodiment, drive stimulus patterns may be transmitted from the touch controller such that some drive electrode pads 44 are driven with signals that are in-phase while other drive electrodes may be driven with signals that are out-of-phase.

For example, all the drive electrodes would be driven at the same time. However, some drive electrodes receive signals that may be in-phase while the remaining drive electrodes receive signal that may be out-of-phase.

The result may be that during certain measurement operations, some regions of the touch sensor may have strong electric fields where the collection of drive electrodes are all in-phase. In contrast, in other regions where there may be a substantially equal mix of in-phase and out-of-phase drive electrodes, the net electric field may be very small. Still other regions may have a higher mix of in-phase drive electrodes than out-of-phase drive electrodes that may result in a weak in-phase electric field that is not as strong as it could be, but not as weak as it could be. Similarly, if a region had a higher mix of out-of-phase drive electrodes than in-phase drive electrodes, the resulting electric field may be weaker than the scenario above but still have a useful electric field.

Accordingly, a variety of stimulus patterns may be used to create a variety of electrical patterns having various levels of strength across the touch sensor and across many measurement periods.

In one example of what might be done with regions having various levels of strength of electric fields is that the results from each of the sense electrode's Analog-to-digital (ADC) conversions for each measurement may be a vector. The capacitance at each junction may be determined by finding the dot product of each orthogonal vector. The result may be a capacitance magnitude image of the entire surface of the touch sensor.

Figure 4:
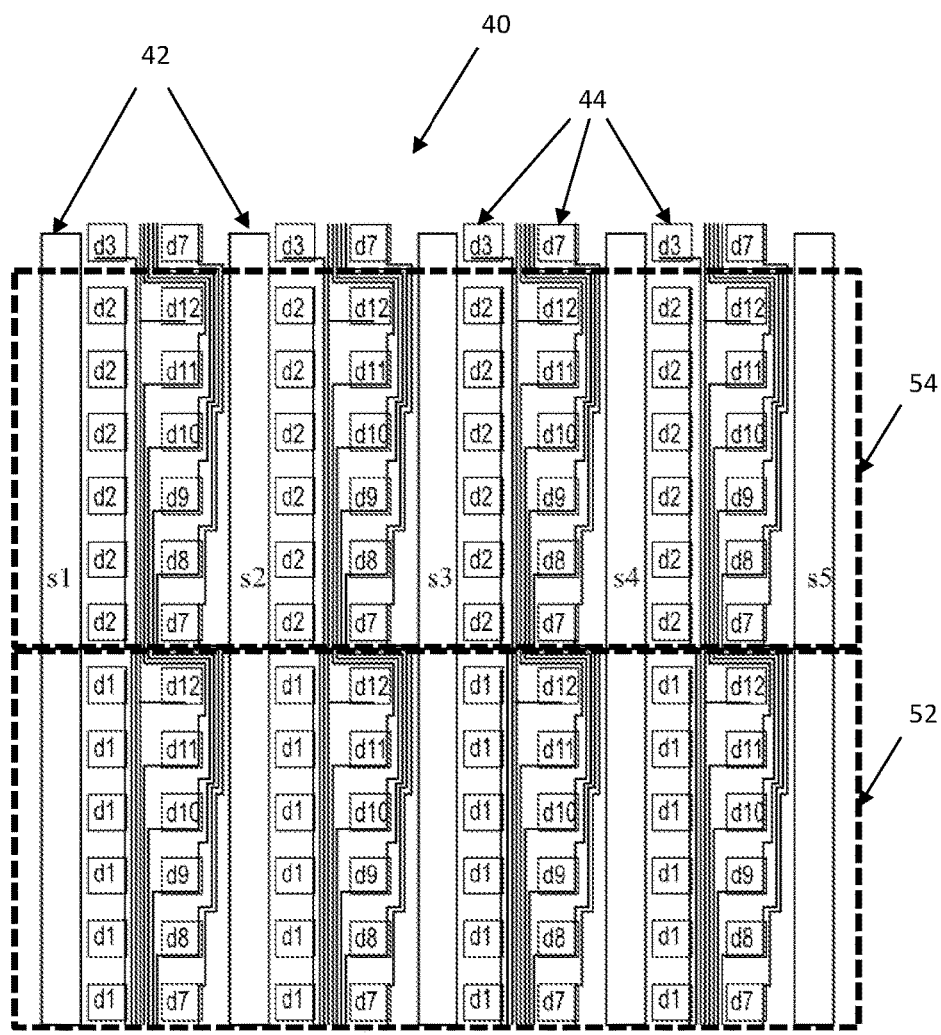
FIG. 4 is a block diagram of the components of a capacitance-sensitive touchpad as made by CIRQUE® Corporation and which may be used in a second embodiment arrangement of drive and sense electrodes in a single layer touch sensor.

FIG. 4 shows another embodiment of the present invention. In this embodiment there may be regions that have one particular drive electrode pad 44 that is repeated numerous times so that in effect, the repeated drive electrode pad occupies substantially more area than other drive electrodes in that same region. This larger number of one drive electrode pad 44 may function as a 'qualifier' to the other drive electrodes in that particular region. In other words, the repeated drive electrode pad 44 may be driven with the same phase as other drive electrodes pads 44 in that same region which are simply not repeated or repeated a fewer number of times. The effect may be to form a larger electric field for a finger to interact with for a particular measurement.

Other regions that are not of interest during a particular measurement may also have repeated electrode drive pads 44 that are being driven. While this may be undesirable, the creation of an electric field may be countered by stimulated adjacent drive electrode pads that are out-of-phase, thereby canceling the electric field in the regions where an electric field is not desired.

Therefore, in FIG. 4, a first region 52 is shown having a repeated electrodes drive pad 44 labeled d1. Therefore, electrode drive pad d1 is the dominant drive electrode pad 44 of the first region 52. If the electrode drive pad d1 is driven with a signal, this may qualify the first region 52 as the region in which touch measurements are being taken. The second region 54 illustrates that the dominant electrode drive pad 44 is labeled d2, so d2 would be stimulated in order to make the second region 54 the dominant region.

Figure 5:
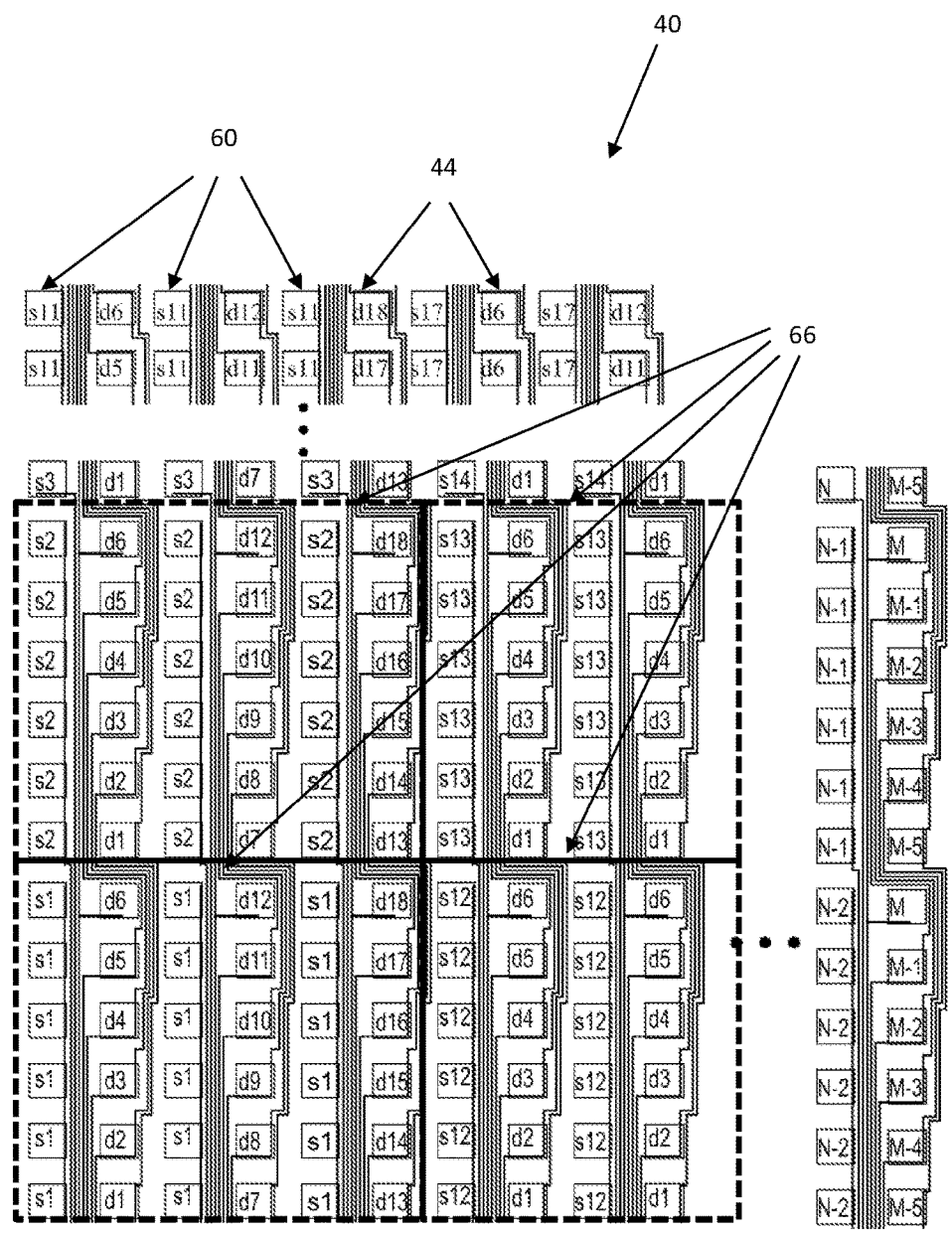
FIG. 5 is a block diagram of the components of a capacitance-sensitive touchpad as made by CIRQUE® Corporation and which may be used in a third embodiment arrangement of drive and sense electrodes in a single layer touch sensor.

FIG. 5 shows another embodiment of the present invention. Instead of using large sense electrodes that may be used by multiple regions in the previous embodiments, the sense electrode may be comprised of a plurality of smaller sense electrode pads 60. One advantage is that sensing may be localized to smaller areas of the touch sensor 40 that may be assigned different functions much like the drive electrode pads 44. In this embodiment, the sense electrode pads 60 may be grouped in smaller regions over multiple shorter columns. The adjacent drive electrode pads 44 may be unique for each section of the sense electrodes. This division of the sense electrodes into smaller electrodes may create unique 'addressing' for even smaller regions of the touch sensor 40.

The advantage of this method may be that drive electrode pads 44 in each column may be repeated up the column for each unique set of adjacent sense electrode pads 60, thus enabling the creation of large touch sensors 40.

It is noted that some sense electrode pads 60 may be routed from the bottom of the touch sensor 40 while others could be routed from the top of the touch sensor. The functions of the sense electrode pads 60 may also be swapped with the drive electrode pads 44 in any of these embodiments, thus, any electrode pad could be a drive electrode pad 44 or a sense electrode pad 60 for any measurement.

The embodiments above demonstrate the versatility of being able to not only reassign the function of electrodes as needed, but also the ability to group electrodes together to create larger and larger touch sensors by creating many regions that do not interfere with each other. In addition, the size of the regions may also be varied.

In another aspect, adjacent regions may be assigned different functions by using in-phase and out-of-phase drive signals, or different groupings of drive and sense electrode pads.

FIG. 5 shows the various regions that may be created. The different regions 62 are shown by grouping them based on association with a particular set of sense electrode pads 60. FIG. 5 also shows that the regions extend to the top or bottom, to the left or the right as desired.

The embodiments of the present invention may refer to a method for reducing a number of routing traces to a touch sensor by creating touch sensor regions of drive and sense electrode pads wherein different regions have different arrangements of drive and sense electrode pads.

The method may be comprised of first providing a touch sensor controller of a touch sensor for generating drive signals that are transmitted to drive electrode pads through drive routing traces, and for receiving sense signals from a plurality of sense electrodes through sense routing traces. The method may also be comprised of forming touch sensor regions in the touch sensor, wherein adjacent touch sensor regions have different arrangements of sense electrode pads and drive electrode pads such that adjacent touch sensor regions do not create electric fields that interfere with each other.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for reducing the space occupied by a number of routing traces to a touch sensor by creating touch sensor regions of drive and sense electrode pads wherein different touch sensor regions have different arrangements of drive and sense electrode pads, said method comprised of:
    providing a touch sensor controller of a touch sensor for generating drive signals that are transmitted to drive electrode pads through drive routing traces, and for receiving sense signals from a plurality of sense electrodes through sense routing traces; and
    forming touch sensor regions in the touch sensor each touch sensor region comprising:
        a first plurality of discrete drive electrode pads arranged in a first column having an inner side and an outer side;
        a second plurality of discrete drive electrode pads arranged in a second column having an inner side and an outer side, and wherein the inner side of the first column is adjacent to the inner side of the second column;
        a first sense electrode adjacent to the outer side of the first column; and
        a second sense electrode adjacent to the outer side of the second column; and, wherein adjacent touch sensor regions do not create electric fields that interfere with each other;
    providing paths for the drive routing traces in each touch sensor region that traverse both the inner side and the outer side of the first and the second columns.

2. The method as defined in claim 1 wherein the method further comprises disposing at least one of the first sense electrode or the second sense electrode across adjacent touch sensor regions.

3. The method as defined in claim 1 wherein the method further comprises not disposing at least one of the first sense electrode or the second sense electrode across adjacent touch sensor regions.

4. The method as defined in claim 1 wherein the method further comprises disposing multiple copies of the touch sensor region having a specific arrangement of first and second sense electrodes and first plurality and second plurality of discrete drive electrode pads on a same row of touch sensor regions in the touch sensor as long as none of the copies are adjacent to each other.

5. The method as defined in claim 4 wherein the method further comprises disposing multiple copies of the touch sensor region having a specific arrangement of first and second sense electrodes and first plurality and second plurality of drive electrode pads on a same column of touch sensor regions in the touch sensor as long as none of the copies are adjacent to each other in a same column or a same row.

6. The method as defined in claim 1 wherein the method further comprises transmitting drive signals to the first plurality or second plurality of drive electrode pads that will create a strong electric field in a first touch sensor region, while those same drive signals will create a weak electric field in a second touch sensor region that is adjacent to the first touch sensor region because of the different arrangement of the first plurality or second plurality of drive electrode pads in the first touch sensor region and the second touch sensor region.

7. The method as defined in claim 1 wherein the method further comprises driving selected ones of the first or second plurality of drive electrode pads with a first signal that is in-phase and driving different selected ones of the first or second plurality of drive electrode pads with a second signal that is out-of-phase with the first signal to thereby modify the electric field that is generated in the touch sensor regions.

8. The method as defined in claim 7 wherein the method further comprises the step of transmitting some in-phase drive signals and out-of-phase drive signals to a same touch sensor region to thereby vary a strength of an electric field that is generated within the touch sensor region.

9. A method of routing traces to a touch sensor the method comprising:
    providing a touch sensor controller of a touch sensor for generating drive signals that are transmitted to drive electrode pads through drive routing traces, and for receiving sense signals from a plurality of sense electrodes through sense routing traces; and
    forming touch sensor regions in the touch sensor each touch sensor region comprising:
        multiple copies of a single sense electrode pad arranged in a first column having an inner side and an outer side in each of the touch sensor regions;
        a plurality of discrete drive electrode pads arranged in a second column having an inner side and an outer side, and wherein the inner side of the first column is adjacent to the inner side of the second column;
    providing paths for the drive routing traces in each touch sensor region that traverse both the inner side and the outer side of the second column; and
    wherein the plurality of discrete drive electrode pads within each of the touch sensor regions is different for adjacent touch sensor regions.

10. A method of routing traces to a touch sensor the method comprising:
    providing a touch sensor controller of a touch sensor for generating drive signals that are transmitted to drive electrode pads through drive routing traces, and for receiving sense signals from a plurality of sense electrodes through sense routing traces; and
    forming touch sensor regions in the touch sensor each touch sensor region comprising:
        a first plurality of discrete drive electrode pads arranged in a first column having an inner side and an outer side;

a second plurality of discrete drive electrode pads arranged in a second column having an inner side and an outer side, and wherein the inner side of the first column is adjacent to the inner side of the second column;

a first sense electrode adjacent to the outer side of the first column; and a second sense electrode adjacent to the outer side of the second column; and, wherein adjacent touch sensor regions do not create electric fields that interfere with each other;

providing paths for the drive routing traces in each touch sensor region that traverse both the inner side and the outer side of the first and the second columns; and wherein the second plurality of discrete drive electrode pads are different drive electrode pads in each of the touch regions, but the first plurality of discrete drive electrode pads are multiple copies of one drive electrode pad such that the one drive electrode pad dominates each touch sensor region because of the number of multiple copies of the one drive electrode pad that are disposed within the touch sensor region.

* * * * *